United States Patent
Toro

(10) Patent No.: US 10,407,257 B2
(45) Date of Patent: Sep. 10, 2019

(54) APPARATUS FOR SORTING OBJECTS

(71) Applicant: SYSTEM S.P.A., Fiorano Modenese (modena) (IT)

(72) Inventor: Andrea Toro, Fiorano Modenese (IT)

(73) Assignee: SYSTEM S.P.A., Fiorano Modenese (IT)

( * ) Notice: Subject to any disclaimer, the term of this patent is extended or adjusted under 35 U.S.C. 154(b) by 0 days.

(21) Appl. No.: 15/569,998

(22) PCT Filed: Jun. 7, 2016

(86) PCT No.: PCT/IB2016/053323
§ 371 (c)(1),
(2) Date: Oct. 27, 2017

(87) PCT Pub. No.: WO2016/199010
PCT Pub. Date: Dec. 15, 2016

(65) Prior Publication Data
US 2018/0155139 A1   Jun. 7, 2018

(30) Foreign Application Priority Data
Jun. 9, 2015   (IT) ...................... 102015000021918

(51) Int. Cl.
| | | |
|---|---|---|
| *B65G 57/03* | (2006.01) | |
| *B65G 57/04* | (2006.01) | |
| *B65G 61/00* | (2006.01) | |

(52) U.S. Cl.
CPC ........... *B65G 57/035* (2013.01); *B65G 57/04* (2013.01); *B65G 61/00* (2013.01)

(58) Field of Classification Search
CPC ....... B65G 57/035; B65G 61/00; B65G 57/04
USPC ............ 414/788.4, 790.9, 792.7, 793, 793.8
See application file for complete search history.

(56) References Cited

U.S. PATENT DOCUMENTS

| | | | | |
|---|---|---|---|---|
| 2,675,928 | A | * | 4/1954 | Slater ................... B65G 57/035 414/792.2 |
| 3,187,877 | A | * | 6/1965 | McGrath ................ B65G 57/00 198/634 |
| 3,612,300 | A | * | 10/1971 | Berghgracht .......... B65H 29/66 414/791 |
| 3,718,263 | A | * | 2/1973 | Strecke ..................... B66C 7/00 212/333 |

(Continued)

FOREIGN PATENT DOCUMENTS

| | | |
|---|---|---|
| JP | 2000118714 A | 4/2000 |
| WO | 2014097018 A1 | 6/2014 |

*Primary Examiner* — Lynn E Schwenning
(74) *Attorney, Agent, or Firm* — Pearne & Gordon LLP

(57) ABSTRACT

An apparatus for sorting objects conveyed by a conveyor line comprises a conveyor line (2) at which the objects (3) are sorted, a plurality of gripping means (4) of the objects (3) that operate at the portion of the conveyor line (2). The gripping means (4), on command and selectively, pick up the objects present on the portion of the conveyor line (2) and transfer them onto supports (5) disposed in temporary staying areas, selected for forming stacks of objects (3) homogeneous with each other. Lifting and conveyor means (6) are provided for lifting, on command, single objects or stacks of objects (3) which are resting on supports (5) in selected temporary staying areas and for conveying them onto an evacuation line.

8 Claims, 6 Drawing Sheets

(56) References Cited

U.S. PATENT DOCUMENTS

Figure 1:
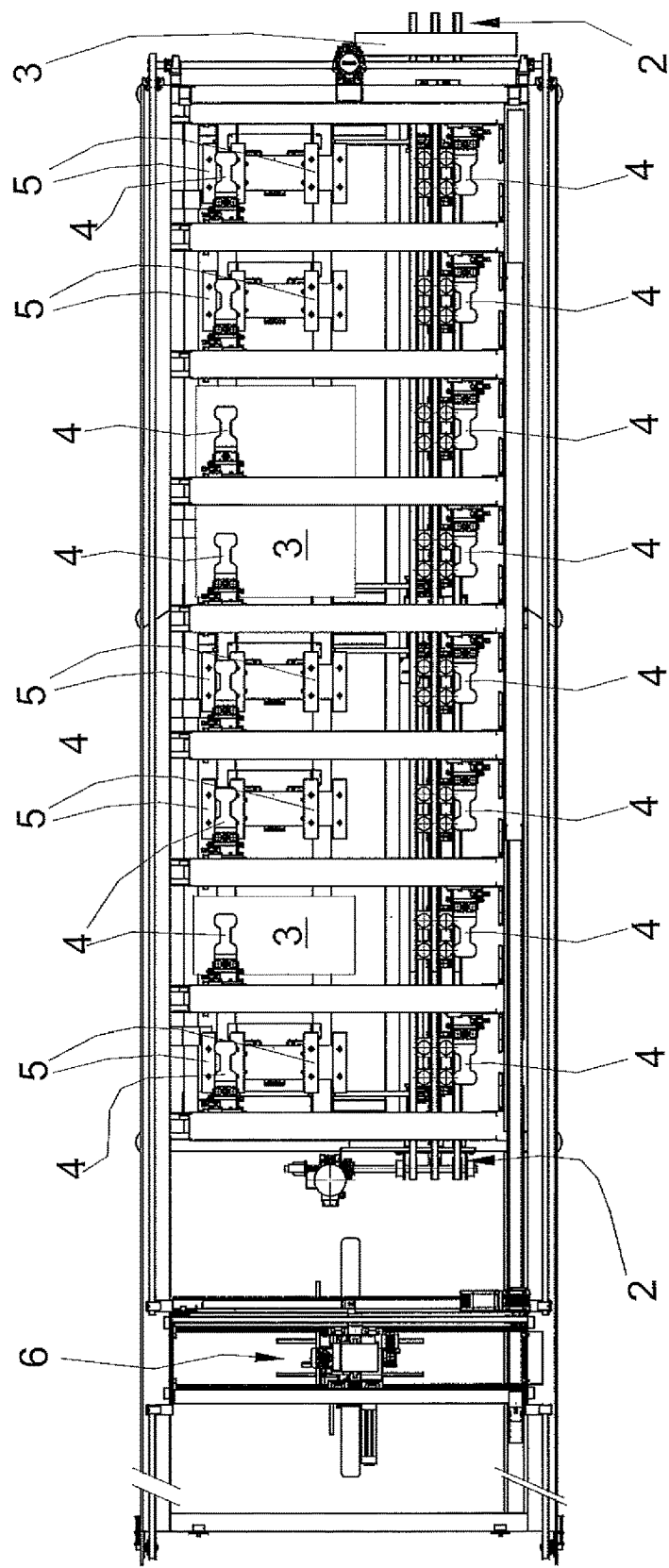

| | | | | |
|---|---|---|---|---|
| 3,904,043 A | * | 9/1975 | Jones | B65G 57/035 |
| | | | | 414/790.3 |
| 4,073,388 A | * | 2/1978 | Carter | B65G 57/00 |
| | | | | 414/564 |
| 4,420,295 A | * | 12/1983 | Clear | B28B 1/16 |
| | | | | 118/126 |
| 4,978,275 A | * | 12/1990 | Reid | B65G 57/005 |
| | | | | 198/419.1 |
| 4,984,963 A | * | 1/1991 | Bon | B65G 57/005 |
| | | | | 414/789.5 |
| 5,000,655 A | * | 3/1991 | Pate | F27D 3/0021 |
| | | | | 198/463.4 |
| 5,630,695 A | | 5/1997 | McDonnell | |
| 5,672,045 A | * | 9/1997 | Schmid | B65G 47/53 |
| | | | | 414/790.8 |
| 5,697,762 A | * | 12/1997 | Thompson | A41H 43/0214 |
| | | | | 112/470.36 |
| 6,146,084 A | * | 11/2000 | Doyle | B65G 57/035 |
| | | | | 414/788.9 |
| 9,630,731 B2 | | 4/2017 | Toro | |
| 9,950,879 B2 | * | 4/2018 | Toncelli | B66C 17/06 |
| 2008/0182737 A1 | * | 7/2008 | Jost | B21D 43/18 |
| | | | | 483/14 |
| 2012/0297733 A1 | * | 11/2012 | Pierson | B65G 47/086 |
| | | | | 53/447 |
| 2014/0369800 A1 | * | 12/2014 | Marks | B66C 1/447 |
| | | | | 414/792.8 |
| 2015/0298840 A1 | | 10/2015 | Toro | |

\* cited by examiner

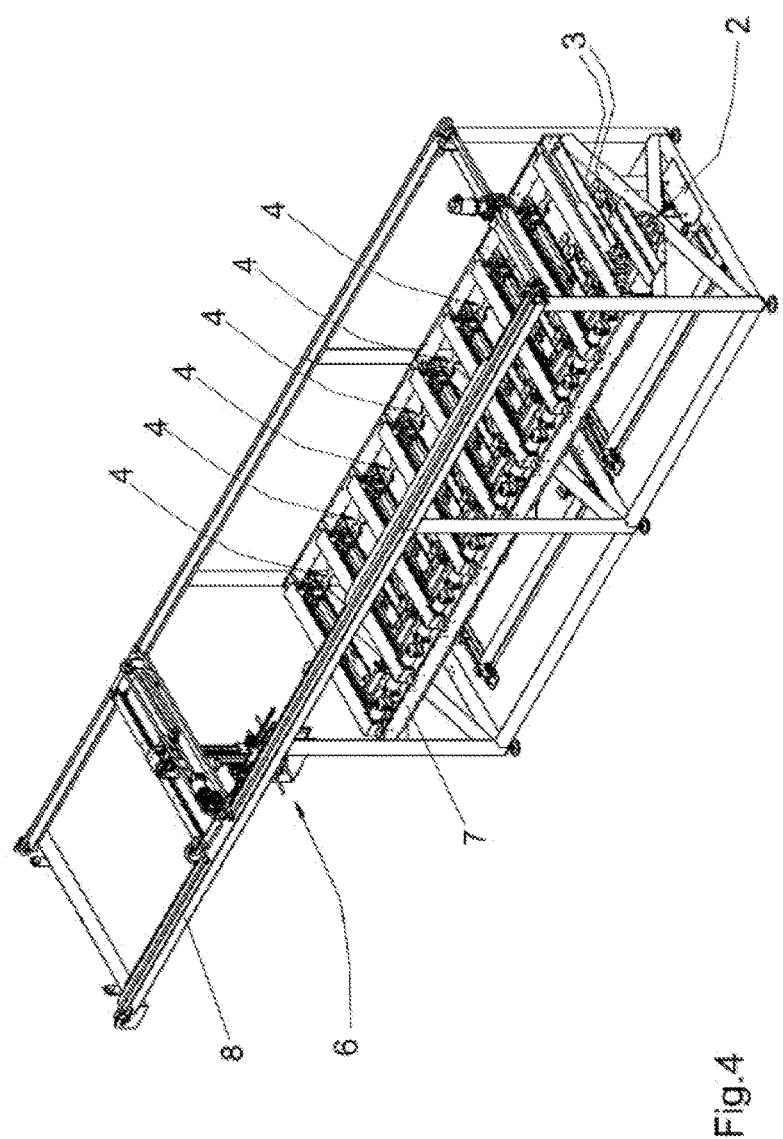

APPARATUS FOR SORTING OBJECTS

Subject of the present invention is an apparatus for sorting objects. Specifically, but not exclusively, the apparatus finds useful application in packaging lines, where the objects coming from a continue conveyor line, along which they are basically transferred in a row and generally spaced from one another, are to be sorted, i.e. separated from one another based on certain characteristics assessed upstream of the sorting.

The sorting performs the essential function of separating the objects from the line according to corresponding characteristics, so that the objects themselves may be later matched respectively on the basis of uniformity characteristics. For example, in the case of slabs or tiles (of the ceramic type or the like), the sorting allows formation of stacks consisting of a pre-determined number of homogeneous objects. These stacks of homogeneous objects are then ready for a subsequent packaging step.

A particularly advantageous and effective apparatus presently available, is disclosed in the publication WO2014/097018. Such apparatus comprises a conveyor line via which sorting of the objects is implemented. A plurality of gripping means are arranged to operate, on command, the picking up of the objects present on the conveyor line and to transfer them onto corresponding supports disposed within temporary staying areas according to the characteristics of each single object, so that stacks of homogeneous objects are formed. Lifting and conveyor means provides to lift the stacks of objects from the supports and to transfer the same to an evacuation line.

In respect to the processing speed, the apparatus described above could be improved. The gripping means, in fact, provides to pick up the objects from the conveyor line and to deposit them onto the temporary supports which are placed at a lower height with respect to the conveyor line. After having picked up one or more objects from the conveyor line, the gripping means must then perform a lateral displacement and a downward displacement, until reaching a support or the top of a partially formed stack. Following this downward stroke, the gripping means should of course perform a reverse upward stroke. This results in a considerable elongation of processing times.

It is an aim of the present invention to overcome the drawbacks of the currently available machines.

The present invention particularly allows to achieve the result of not having the need of neither adaptations nor adjustments in the event of format changes of the objects to be treated. Different formats can be treated on the same conveyor line indeed. Further advantages can be found which are due to the fact that formation of the stacks occurs at the edge of the conveyor line that may then advance without slowing down.

A further advantage of the invention consists in the fact that the entire stacks evacuation device operates in the lower part of the sorting device, without substantially interfering with the to-be-stacked incoming objects and with the formation of the stacks themselves.

Figure 2:
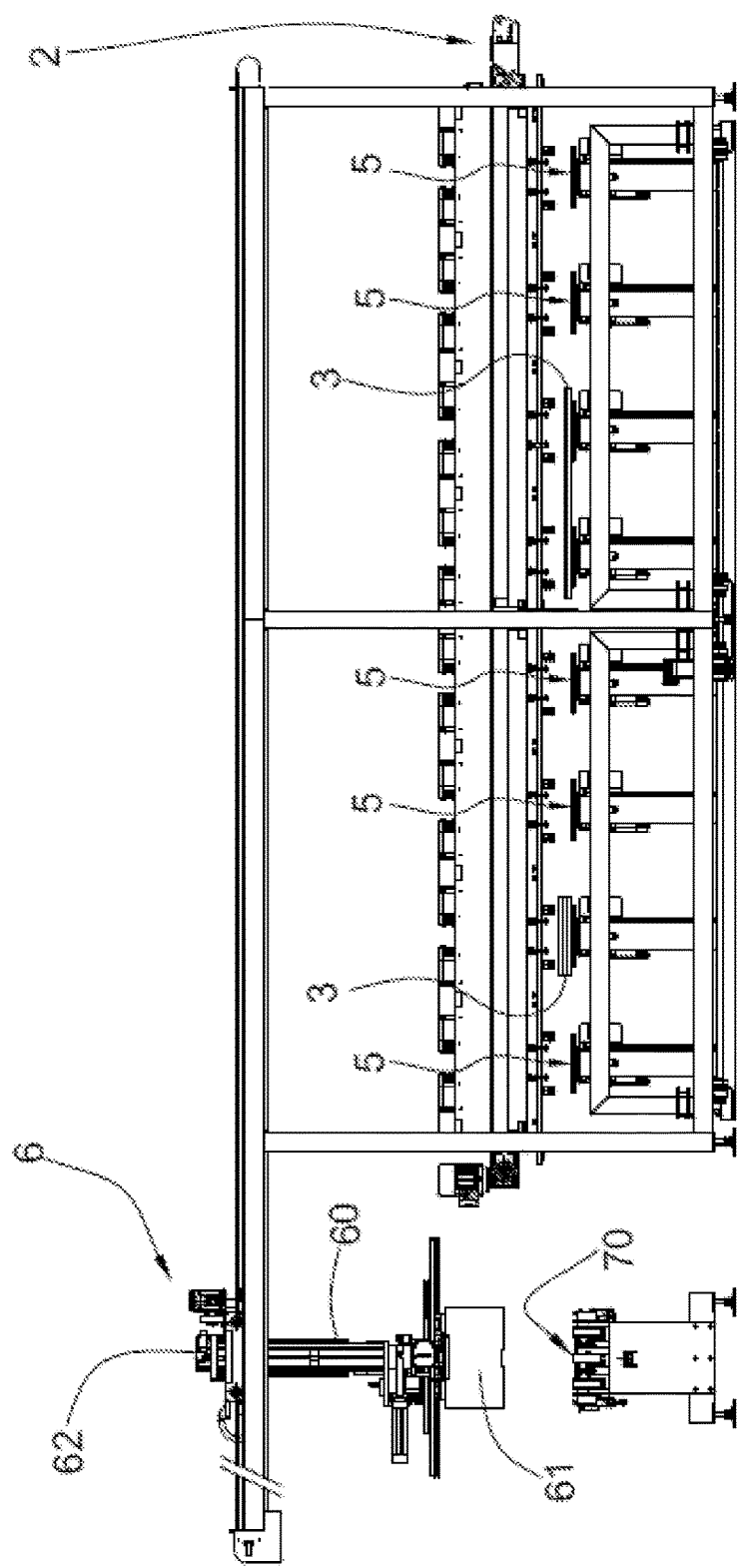
Figure 3:
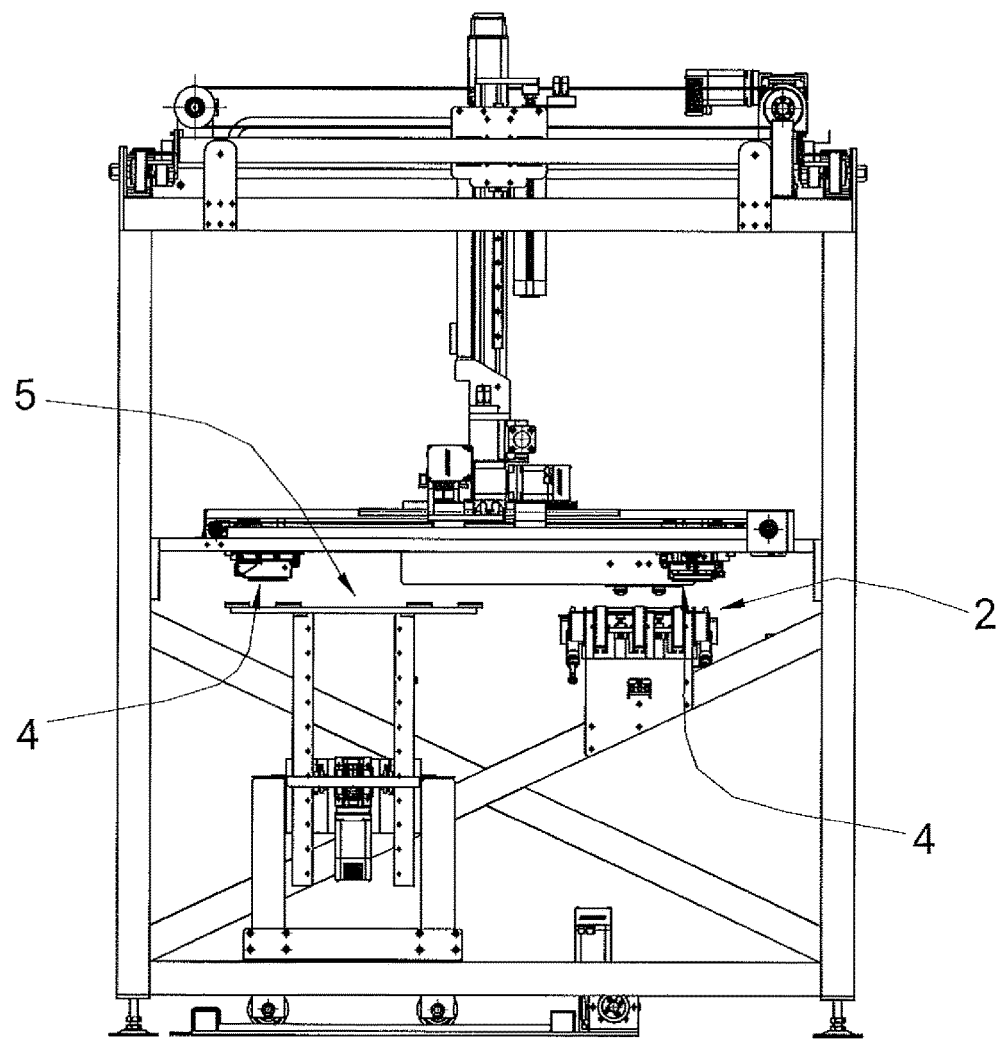
Figure 3A:
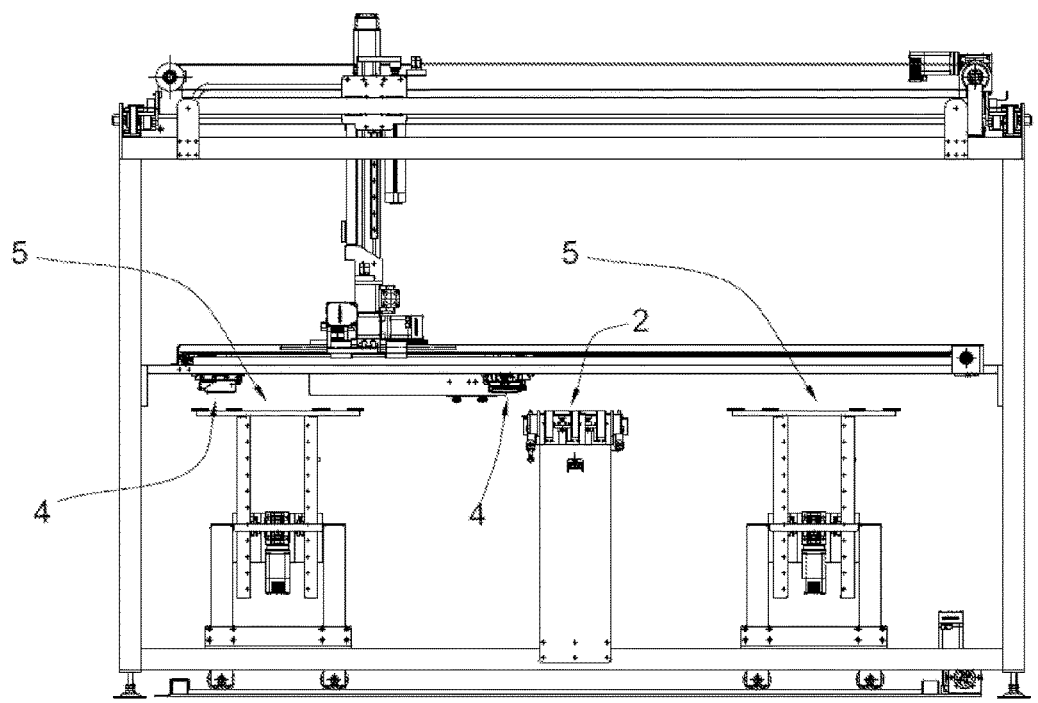
Figure 6:
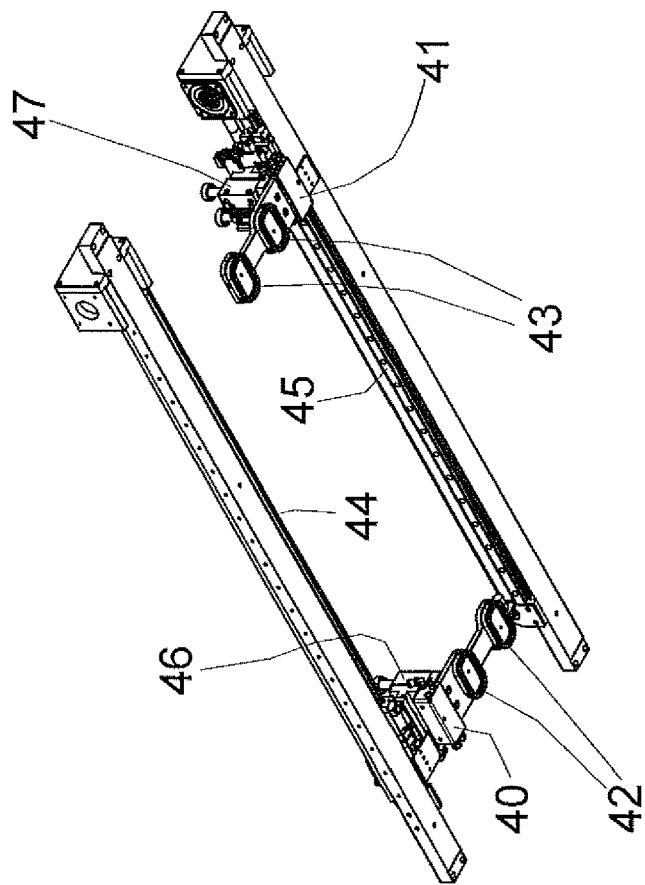
Figure 5:
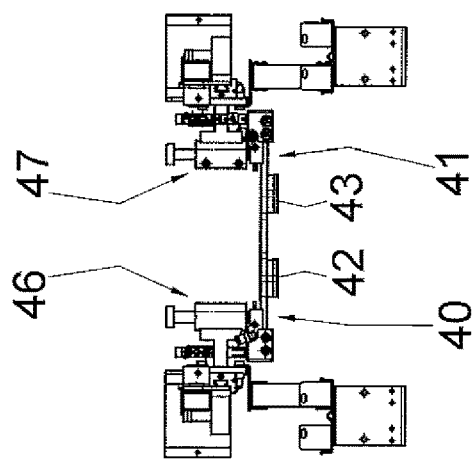

Further characteristics and advantages of the present invention will better emerge from the detailed description that follows of a preferred but not exclusive embodiment illustrated below by way of non-limiting example in the appended figures wherein:

FIG. 1 shows a schematic top plan view of the apparatus;
FIG. 2 shows a schematic side view of the apparatus;
FIG. 3 shows a view from the left of FIG. 2;
FIG. 3a shows another configuration of the apparatus of FIG. 2 with supports located on both sides of the conveyor;
FIG. 4 shows a schematic axonometric representation of the apparatus according to the present invention;
FIG. 5 shows, in enlarged scale, an apparatus part, i.e. a group for the movement of two gripping means;
FIG. 6 shows, in enlarged scale, a perspective view of the component of FIG. 5.

The apparatus for sorting objects according to the present invention essentially performs the function of separating the objects 3 coming from a continuous conveyor line 2, along which the objects are transferred arranged in a row and suitably spaced from one another. In the embodiment described herein, it is illustrated only one conveyor line 2, although two or more conveyor lines placed alongside one to another can also be provided.

The objects 3 can be distinguished one from another based on different characteristics, according to which they can be divided into corresponding homogenous groups.

In the illustrated embodiment, the objects 3 are in the form of slabs or tiles (of the ceramic type or the like), that are sorted so as to be grouped to form stacks of homogeneous objects.

In the specific case, the homogeneity is basically determined by the format.

However the apparatus can be used for sorting objects of any kind, also the ones exhibiting a non-flat shape, which however is still suitable for allowing stacking of the objects themselves.

A plurality of gripping means 4 of the objects 3 are provided to operate at the transport line 2.

These gripping means 4 operate, on command and selectively, the picking up of the 3 objects present on the conveyor line 2, and provide to transfer the same onto movable support 5, which are suitable for supporting stacks of homogeneous objects 3 in temporary staying areas.

In the embodiment illustrated herein, movable supports 5 are provided at one side of the conveyor line 2, although it would be possible to have movable supports 5 along both sides of the conveyor line 2. The temporary staying areas defined by the supports 5 are located at a lower height with respect to the conveyor line 2.

The temporary staying areas are identified from time to time on the supports 5 for the formation of individual stacks of objects. In fact, a suitable command and control system provides to individuate the homogeneous objects 3 and to command a selective picking up of the objects 3 from the conveyor line 2, for finally providing stacking thereof in one of the temporary free staying areas.

Lifting and conveyor means 6 on second guides 8 are provided to lift, on command, single objects or stacks of objects 3 previously supported on the supports 5 in the related temporary staying areas and to transfer them to an evacuation line (not shown).

The gripping means 4, which are distributed along the conveyor line 2, on first guides 7 are operable individually or in groups in a synchronous manner, depending on the size of the objects 3 to be picked up and transferred. In other words, in the presence of a small format of the objects 3 whereon the gripping means are acting, such gripping means are activated individually, whilst when the size of the objects 3 is greater, such gripping means are activated synchronously in groups that consist of two or more gripping means.

The gripping means 4 are activated synchronously in groups so that the objects 3 which are grasped, are constrained on the basis of a substantially barycentric system.

In particular, the gripping means 4 are acting above the conveyor line 2 and the gripping of the objects 3 present on the conveyor line 2 occurs by grasping the upper surfaces thereof.

As already mentioned, the supports 5 are so structured as to define the selected temporary staying areas intended for stacks of homogeneous objects 3. The supports 5 are vertically movable between at least an upper position, shown in FIG. 3, and at least one lower position, shown in FIG. 3*a*. In the upper position, each support 5 is however located inferiorly to the conveyor line 2.

In particular, each support 5 identifies at least a supporting plane which, from the upper position to the lower position, remains placed inferiorly to the conveyor line 2. In the lower position, the supporting plane defined by each support 5 is located at a distance from the conveyor line 2 that defines a clear height in the vertical direction, which height is intended as the maximum useful height to allow handling of the objects or stacks of the objects 3 to be sorted, i.e. the maximum height of the stacks of the objects 3 which can be formed.

In the upper position, each support 5 may receive a first object 3 which is inferiorly arranged and comes to be the first object of a stack that is being formed gradually thereon. After receiving a first object 3, the support 5 is actuated in translation by a pre-determined pitch towards the lower position, i.e. the support is lowered to such an extent such as to allow positioning of a next object 3 on the one already present on the support 5 itself. The height reached by the support 5 when lowered, basically corresponds to the thickness of the object 3, which is to be deposited thereafter. In other words, for each object 3 that is to be made to rest on the stack, the supporting plane 3 substantially keeps the same height while the stack is being formed. The formation of the stack gradually proceeds in the manner described above: prior to the deposit of each object 3, the support 5 is lowered by one pitch and so on, until the desired number of objects to be stacked, is reached. All this applies both to supports 5 which alone can support a stack of objects, as well as to supports 5 which may be selected simultaneously in order to support, in co-operation, objects 3 of larger dimensions.

The gripping means 4 preferably comprise one or more suction cups. They are mounted on handling units 40, 41 each of which is provided with one or more suction cups 42, 43. Each suction cup 42,43 is operable independently from the other, so that a single piece can be picked up. The suction cups 42,43 of each of the gripping means 4 and of different gripping means 4, can be further operated simultaneously in order that a single piece can be supported and picked up, which exhibits a greater weight and/or size. By way of example, in FIG. 1 the left object 3 could be supported in a barycentric position by a gripping means 4, or by two gripping means 4 in symmetrical positions with respect to a median vertical plane of the object. The right object 3, of larger dimensions, could be supported by two gripping means 4 arranged along the center line of the object 3 itself, or by four gripping means 4.

The handling units 40, 41 are movable and positionable on command along guides 44, 45 transversal to the direction of the forward motion of the objects 3 on the portion of the conveyor line 2.

Members 46, 47 are provided for performing, on command, the vertical displacements of the relative first and second suction cups 42, 43.

The system allows picking up on command the individual objects 3 by way of gripping means 4 units that are actuated in a synchronous manner, to transfer the picked up objects on the vertical axis of the stack which is being formed, and to place said objects in a centered manner onto the stack. Thanks to the presence of the movable support 5, the vertical stroke that the gripping means 4 must perform in order to deposit the picked up objects 3, as well as the resulting reverse stroke, are considerably reduced. Indeed, the movable supports 5 maintain substantially unchanged the height at which the object of each stack are placed. This entails a considerable reduction in processing time.

It is so implemented the first part of the objects sorting, which implies selecting the homogeneous objects and then forming homogeneous stacks thereof in temporary staying areas located at the sides of the conveyor line.

The stacks of homogeneous objects stored temporarily on the supports 5, are then evacuated without interfering with the formation of homogeneous stacks taking place via a device that is placed inferiorly or superiorly to the supports 5 themselves; this device comprises lifting and conveyor means 6 acting on command for lifting the stacks of objects 3 (or in some cases the single objects), placed on the supports 5 in the selected temporary staying areas, and to transfer the same to an evacuation line 70.

In the embodiment shown, such lifting and conveyor means 6 comprise a lifting device 60 provided with a pair of pressers 61 that are so structured as to tighten a stack of objects 3 therebetween. The pressers 61 are movable in the vertical direction between a lower position, in which the pressers 61 can tighten and pick up a stack of objects 3 from the supports 5, and an upper position, located above the supports 5, in which the pressers 61 raise the stack of objects 3 from the supports 5 themselves.

The lifting device 60 can translate in a direction transverse to the direction of motion of the conveyor line 2 and is constrained to a carriage 62 that can move in a direction parallel to the direction of motion of the conveyor line 2 up to the evacuation line 70, the evacuation motion direction of which is parallel to the direction of motion of the carriage 61.

The apparatus according to the present invention allows to greatly reduce the processing time for the stacks of objects being formed. Thanks to the presence of the movable support 5, which are lowered gradually during the formation of the stack, the vertical stroke to be performed by the gripping means 4, is greatly reduced.

The stacks which are being formed are further placed on the sides of the conveyor line 2, so that actuation of the gripping means 4 does not interfere with the advancement of the conveyor line.

Furthermore, thanks to the high working speed and the structural independence existing between the formation of homogeneous objects stacks and the evacuation of the stacks themselves, such stacks can be matched in line with presently used selection and packaging lines of ceramic tiles. Further it should be appreciated that the invention is usable for all those flat-shaped products, which can be gripped at the respective faces turned upwards.

The invention claimed is:

1. An apparatus for sorting objects conveyed by a conveyor line, comprising:
    a conveyor line relative to which the objects are sorted;
    a plurality of gripping means for picking up the objects, which gripping means operate at the conveyor line and are suitable for picking up, on command, the objects present on the conveyor line and transferring the same onto movable supports, each support defining a supporting plane for one or more objects, disposed in temporary staying areas selected in order to form stacks of objects homogeneous with each other, wherein the gripping means are movable and positionable along first guides positioned above the movable supports;

lifting and conveyor means suitable for automatically lifting single objects or stacks of objects which are resting on the supports in temporary selected staying areas, and transfer the same onto an evacuation line;

wherein the lifting and conveyor means comprise a lifting device provided with a pair of pressers which are configured for tightening a stack of objects therebetween, wherein the lifting and conveyor means are movable and positionable along second guides, positioned above the movable supports and the first guides;

the pressers are vertically movable between a lower position, in which the pressers can tighten and pick up a stack of objects from the supports, and an upper position, arranged above the supports, in which the pressers lift the stack of objects from the supports;

wherein the movable supports are movable vertically between an upper position, wherein they receive a first object from a stack of objects, and a lower position, wherein they receive a last object from a stack of objects, wherein the supporting plane is located below the conveyor line when the support is in the upper position or the lower position.

2. An apparatus according to claim 1, wherein each movable support is operable with a pre-determined pitch from the upper position toward the lower position after an object was deposited thereon by the gripping means.

3. An apparatus according to claim 1, wherein the gripping means distributed along the conveyor line are operable individually or in groups in a synchronous manner, according to the size of the objects to be picked up and transferred.

4. An apparatus according to claim 3, wherein the gripping means operate above the conveyor line and that the objects which are laying thereon are picked up by said gripping means from the upper surfaces of the objects themselves.

5. An apparatus according to claim 1, wherein the supporting plane for the objects is located substantially at the same height while a corresponding stack of objects is being formed.

6. An apparatus according to claim 1, wherein the gripping means are of the suction cup type and mounted on support bars; the support bars are movable and positionable automatically along guides that are transversal to the direction of the forward motion of the objects on the conveyor line.

7. An apparatus according to claim 1, the lifting device is controlled in translational movement along a direction transverse to the motion direction of the conveyor line; the lifting device is constrained to a carriage, which can be controlled in translation along a direction parallel to the motion direction of the conveyor line, up to the evacuation line.

8. An apparatus according to claim 1, further comprising a plurality of supports on both sides of the conveyor line, up to the evacuation line, each of which supports locates temporary staying areas selected to form stacks of homogeneous objects.

* * * * *